Figure 1:
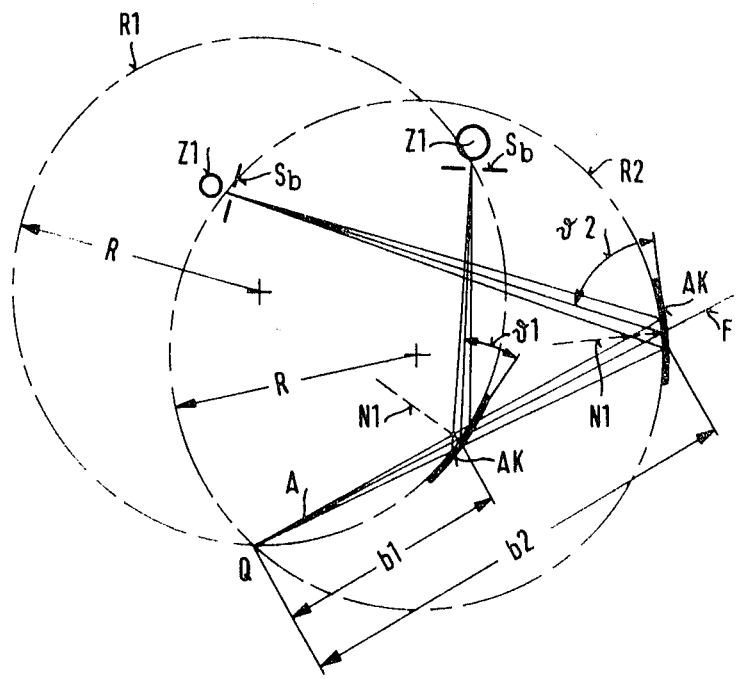

United States Patent

[11] 3,624,395

| [72] | Inventors | Kurt Togel;<br>Hubert Hotzel; Bernhard Lang, all of Karlsruhe, Germany |
|---|---|---|
| [21] | Appl. No. | 881,430 |
| [22] | Filed | Dec. 2, 1969 |
| [45] | Patented | Nov. 30, 1971 |
| [73] | Assignee | Siemens AG<br>Munich, Germany |
| [32] | Priority | Dec. 12, 1968 |
| [33] | | Germany |
| [31] | | P 18 14 321.0 |

[54] ARRANGEMENT FOR COMPENSATING A HYPERBOLIC DEPENDENCY OF THE AMPLITUDE OF VOLTAGE PULSES PRODUCED IN A DETECTOR FOR X-RAY QUANTA
13 Claims, 9 Drawing Figs.

[52] U.S. Cl. .................................................. 250/51.5
[51] Int. Cl. .......................................... G01n 23/00
[50] Field of Search ........................................ 250/51.5

[56] References Cited
UNITED STATES PATENTS

| 2,819,405 | 1/1958 | Bond ............................. | 250/51.5 |
| 3,015,027 | 12/1961 | Burst, Jr. et al. .............. | 250/51.5 |
| 3,119,013 | 1/1964 | Wytzes et al. ................. | 250/51.5 |
| 3,376,415 | 4/1968 | Krogstad et al. .............. | 250/51.5 |

Primary Examiner—Archie R. Borchelt
Attorney—Edwin E. Greigg

ABSTRACT: In a linear X-ray spectrometer with an analyzer crystal displaceable along a straight guide line, a potentiometer pickup is displaceable in proportion to the linear movement of the analyzer crystal. The pickup is attached to the mount of the analyzer crystal and belongs to a potentiometer contained in an amplifier arrangement that compensates the hyperbolic dependency of the amplitude of pulses produced in an X-ray detector.

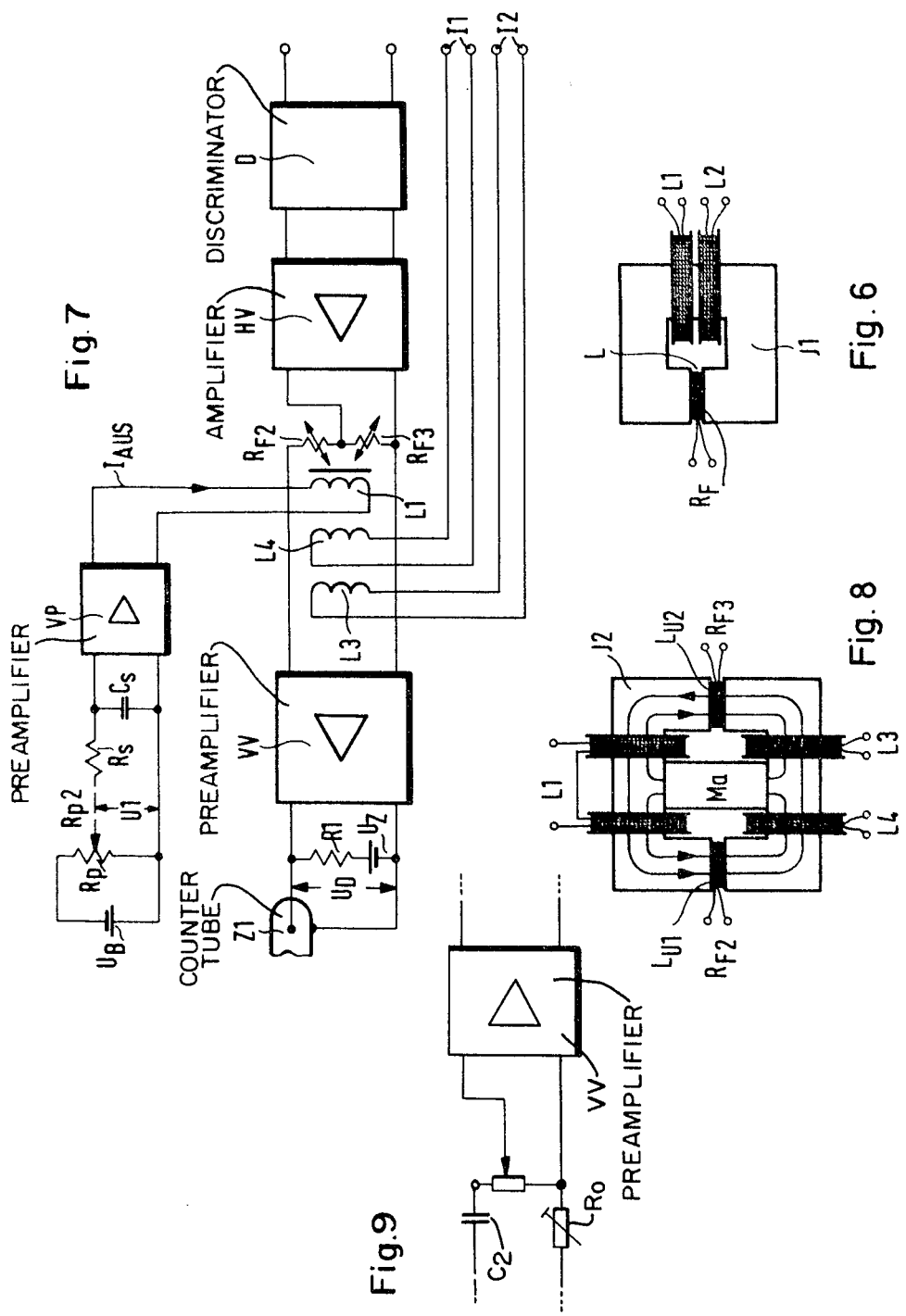

ARRANGEMENT FOR COMPENSATING A HYPERBOLIC DEPENDENCY OF THE AMPLITUDE OF VOLTAGE PULSES PRODUCED IN A DETECTOR FOR X-RAY QUANTA

In a fully focusing X-ray spectrometer, the radiation source (or entrance slit), the analyzer crystal and the focal spot are always situated on a Rowland circle at a certain radius from a central point. If the spectrometer is subjected to the requirement that the angle formed by the direction of the X-rays emitted by a specimen and the specimen are always identical, the adjustment to various Bragg angles $\nu$ is performed by leading the analyzer crystal along a straight guide line. In order to maintain the focal condition, the analyzer crystal must in this connection be turned by an angle $\nu$ in accordance with a definite mathematical relationship and the detector arm supporting a detector must be turned by $2\nu$. Spectrometers that guarantee the maintenance of the two conditions already provide the full utilization of the resolving power and are called linear spectrometers.

The same is valid for linear spectrometers wherein the detector slit is not situated on the focusing circle, but the detector is attached to a shortened arm at an angle $2\nu$ and the effective X-ray to be detected is shielded merely by an antidiffusing screen.

The mathematical relationship between the distance $d$ of the analyzer crystal from the source of radiation, the radius of curvature $2 \cdot R$ ($R$ is the radius of Rowland circle) of the analyzer crystal and the Bragg angle, for a linear focusing spectrometer, is as follows:

$$b = 2R \sin \nu \qquad (1)$$

Furthermore, for the Bragg angle $\nu$ the equation is valid:

$$n\lambda = 2d \sin \nu \qquad (2)$$

or the equation:

$$\sin \nu = (n\lambda/2d) = (nc/nd\nu) = (n \cdot c \cdot h/2d\, E) \qquad (3)$$

In this connection:
$\lambda$ = the wavelength of the reflected radiation
$\nu$ = the frequency of the reflected radiation,
$c$ = the speed of light,
$d$ = the interplanar spacing of the analyzer crystal,
$n$ = the ordinal number of the reflection
$h$ = Planck's constant [quantum of action],
$E$ = the energy of the X-ray quanta.

If equation (3) is inserted in equation (1) and solved with respect to $E$, equation (4) is to be obtained:

$$E = (Rnch/d \cdot b) \approx (n/b\,d) \approx U_D \qquad (4)$$

It can be inferred from equation (4) that energy $E$ and, therewith, the pulse amplitude of the detector output voltage $U_D$ is inversely proportional to distance $b$ of analyzer crystal from the source of X-ray radiation.

The purpose of the invention is to arrange the amplifier coupled to the linear deflection of a spectrometer with linear crystal guide in such a manner that pulses of various intensities or amplitudes released in the detector by various quantum energies are so amplified that pulses of constant amplitude are released at the output of the amplifier so that a readjustment of the discriminator channel is not required with any setting of the spectrometer and with any selection of the analyzer crystal and the ordinal number of reflection.

Therefore, the invention provides an arrangement for the compensation of a hyperbolic dependency of the amplitude of voltage pulses produced in a detector for X-ray quanta, which occurs with a translation movement of an analyzer crystal of a linear X-ray spectrometer along a straight guideline. It is characterized in that a potentiometer pickup, attached to the mount of the analyzer crystal and belonging to a potentiometer contained in an amplifier arrangement which compensates the hyperbolic dependency, is displaceable proportionally to the linear movement of the analyzer crystal. The potentiometer may consist of a sliding resistor or rheostat whose wiper is attachable directly or by means of mechanical coupling elements to a sliding carriage, supporting the analyzer crystal and movable by means of a spindle, or the potentiometer may consist of a round or multiturn potentiometer whose wiper can be connected directly or by means of gearing to the spindle driving the sliding carriage. The sliding, round or multiturn potentiometer is arranged as a series circuit with an ohmic resistance controlling the amplification of the pulse channel in the output circuit of a preamplifier which amplifies the voltage pulses of the detector.

In one of the possible further embodiments of the invention, the potentiometer may be supplied with a direct current in order to avoid the in-scattering of disturbances into the connecting lines between the spectrometer and the amplifier arrangement. In this connection, the voltage taken at the potentiometer pickup can be fed to the input of an amplifier over a filter that suppresses the disturbing voltages. The output current of the amplifier, which is proportional to the input voltage, is impressed on a first coil which, together with a second coil, is attached to a magnet yoke containing a magnetic-field-dependent resistance in its air gap and arranged in the negative feedback circuit of a further amplifier succeeding the preamplifier which amplifies the signal of the detector.

In a further embodiment of the invention, the first coil may be arranged with two further coils on a further magnet yoke with a magnetized center leg and with the magnetic-field-dependent semiconductor resistances arranged in the two air gaps of the outer limbs and forming a voltage divider situated in the output circuit of the preamplifier. The voltage of the said divider taken off a semiconductor resistance constitutes the input voltage for the second amplifier.

The invention is explained more in detail below by means of FIG. 1 illustrating a fully focusing X-ray spectrometer and by means of exemplified embodiments shown in FIGS. 2–9.

FIG. 1 shows schematically the path of the rays of a focusing X-ray spectrometer with linear guide of the crystal. An X-ray source Q, an analyzer crystal AK and a detector Z1 are arranged on a Rowland circle R1 in such a manner that the angle of incidence of an X-ray A, formed between the direction of X-ray A and a normal N1 to analyzer crystal AK, and the angle of emergence of the reflected X-ray A to normal N1 are equal. The X-rays reflected from analyzer crystal AK are focused in detector Z1. A diaphragm S is arranged in front of detector Z1. For example, analyzer crystal AK may be attached to a crystal changer equipped with several curved analyzer crystals that may be introduced selectively into the trace of rays of the spectrometer. The mount of analyzer crystal AK is movable along a straight guide line F. The analyzer crystal is turned in this connection and the wavelength $\lambda$ of the reflected X-ray increases. When analyzer crystal AK is situated on Rowland circle R1, the central perpendicular line of the analyzer crystal is at a distance $b1$ to X-ray source Q. At a distance $b2$ of analyzer crystal AK from X-ray source Q, detector Z1 must be turned so that the focal condition is again established. This can be attained only by arranging X-ray source Q, analyzer crystal AK and detector Z1 on a further Rowland circle R2 having the same radius R as Rowland circle R1. For the relationship between distance $b1$ and $b2$ of analyzer crystal AK from ray source Q, the two equations (5) and (6) are valid, which equations can be derived from equation (1).

$$b1 = 2R \cdot \sin \nu 1 \text{ and } b2 = 2R \cdot \sin \nu 2 \qquad (b\,5)$$

We can infer from equation (4) that energy $E$ and, therewith, pulse amplitude of detector output voltage $U_D$ is inversely proportional to distance $b1$ or $b\,2$ of analyzer crystal AK from X-ray source Q. Pulse amplitude of detector output voltage $U_D$ is also a function of the ordinal number $n$ or reflection as well as of the interplanar spacing $d$ of analyzer crystal AK. In the same manner as the dependency of detector output voltage $U_D$ in relation to distance $b$ of analyzer crystal AK from X-ray source Q is to be eliminated, the variations in the amplitude of output voltage $U_D$ that occur in the case of a crystal change and with the desired change of the ordinal number $n$ of reflection must likewise be automatically compensated.

Figure 2:
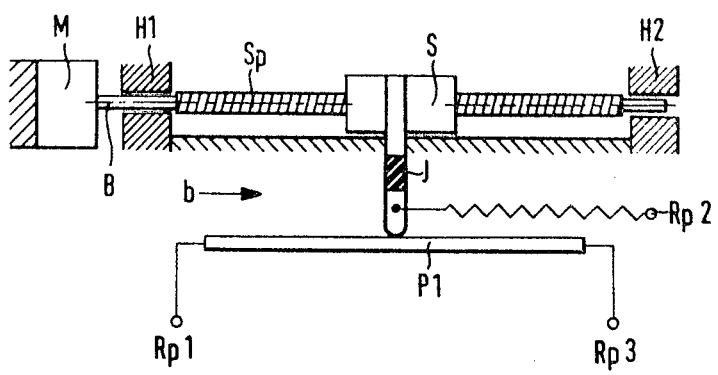

In order to eliminate the hyperbolic connection between voltage $U_D$ and distance $b$ of analyzer crystal AK, a second embodiment of the invention according to FIG. 2 provides a direct or a mechanical coupling connection of a wiper $R_p2$ of a linear potentiometer P1 to a sliding carriage S displaceable by means of a spindle Sp (identical with straight guide line F of FIG. 1). Wiper $R_p2$ is insulated electrically in relation to sliding carriage S by means of an insulator J. Sliding carriage S supports the mount of analyzer crystal or crystals AK. Wiper $R_p2$ slides over potentiometer P1 with connections $R_p1$ and $R_p3$, arranged in parallel with spindle Sp. Spindle Sp is supported in the two bearings H1 and H2 and may be driven through shaft B by means of an electric motor M.

Figure 3:
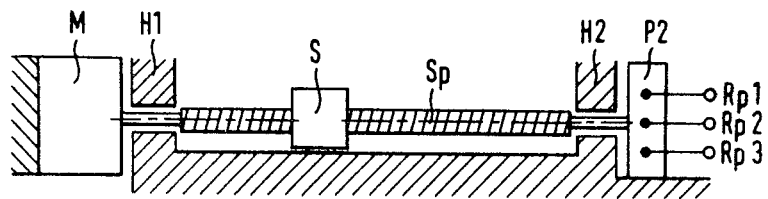

FIG. 3 illustrates a further embodiment of the device of the invention. In place of sliding resistor P1 of FIG. 2, a round potentiometer P2 is connected directly or over gears to spindle Sp. Referring to FIG. 3, round potentiometer P2 is connected directly to the spindle. Also in this case, round potentiometer P2 is provided with connections $R_p1$ and $R_p3$ as well as with a central pickup $R_p2$. Likewise, analyzer crystal AK is attached to sliding carriage S and spindle Sp is supported in bearings H1 and H2 and is driven by motor M. Round potentiometer P2 may include an embodiment having an angle of rotation $\leq 360°$ or of a multiturn potentiometer. A further possibility consists in the employment of a contactless wearfree field plate potentiometer.

Figure 4:
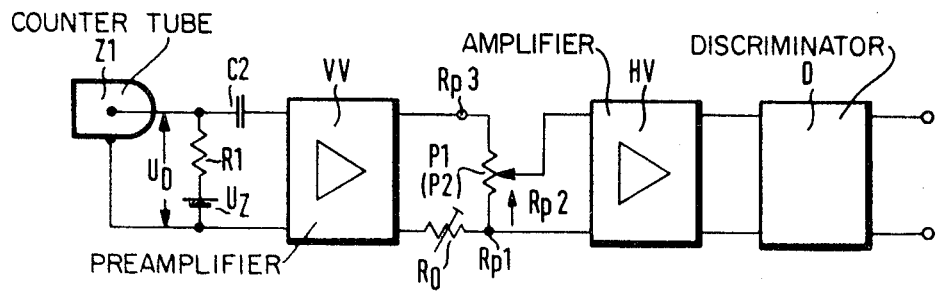

Sliding potentiometer P1, or the round or multiturn potentiometer P2, is adapted to be inserted as circuit elements in an amplifier arrangement shown in FIG. 4. X-ray quanta enter a counter tube Z1 are are converted therein into voltage pulses. The counter tube voltage $U_z$ is applied to counter tube Z1 over a resistance R1. The counter tube pulses are translated to preamplifier VV through a coupling capacitor C2. The output circuit of preamplifier VV contains the series circuit of a resistance $R_0$ and potentiometer P1 with connections $R_p1$ ... $R_p3$. Resistance $R_0$ controls the primary amplification of the pulse channel. The voltage taken off the central pickup across the $R_p2$ and $R_p1$ terminals is amplified by means of a main amplifier HV, the output of which is applied to the input of a discriminator D. The output of the discriminator is in the form of pulses which are applied to a counter for registering or counting thereof. It can be readily understood that the series circuit of sliding or round or multiturn potentiometers, as the case may be, with balancing resistance $R_0$ may be connected ahead of preamplifier VV and after coupling capacitor C2 as shown, for example, in FIG. 9, inside preamplifier VV or in main amplifier HV.

In the position $b=0$ of the sliding carriage S, which corresponds to the carriage S being positioned adjacent bearing H1, pickup $R_p2$ is situated on connection $R_p1$ of potentiometer P1. If sliding carriage S is displaced in the direction b, pickup $R_p2$ is shifted from $R_p1$ toward $R_p3$. The amplification of the pulse channel increases therewith by a factor $K \cdot b$, K being a constant. The hyperbolic relationship between voltage $U_D$ and distance b of analyzer crystal AK (see equation (4)) is eliminated by this amplifier arrangement.

Frequently, the spectrometer and a test cabinet that contains the amplifier electronic equipment are arranged at a great distance apart so that there is a danger of in-scattering of disturbances into the connecting lines. Likewise, the spatially adjacent driving motor and the motor control units may cause disturbances in the potentiometer circuit. The danger of disturbances in the measuring channel is eliminated in accordance with another possible embodiment of the invention shown in FIG. 5. This amplifier arrangement provides for a direct current feed of potentiometer Rp, which may be of the sliding, round or multiturn potentiometer as in FIGS. 2 or 3, from a battery $U_B$. A voltage U1 proportional to distance b of analyzer crystal AK (of FIG. 1) from X-ray source Q is taken off at pickup $R_p2$. This voltage is fed through a filter indicated by a resistance $R_s$ and a capacitance $C_s$, which filter suppresses the disturbing voltages, to the input of preamplifier VP which impresses an output current $I_{AUS}$, proportional to the input voltage, on a coil L1.

Coil L1 is arranged, together with a further coil L2, on a core of a magnet yoke J1 shown in FIG. 6. A magnetically controllable field plate resistance $R_F$ is situated in an airgap L of the magnet yoke J1. Coil L2 is fed with a biasing or magnetizing current $I_V$ for the purpose of setting the working point of the magnetically controllable resistance $R_F$ in the linear portion of its resistance-field-intensity characteristic.

Referring again to FIG. 5, the magnetically controllable resistance $R_F$ is situated in the feedback circuit of amplifier HV which receives the signal supplied by detector Z1. Detector Z1 receives its bias voltage $U_z$ over resistance R1 and the output of the detector is applied to preamplifier VV. For the amplification $V_{HV}$ of amplifier HV, equation (6) is valid, a resistance $R_V$ being a series voltage dropping resistance.

$$V_{HV} \approx (R_F/R_V) \approx R_F \approx b \quad \text{(b)}$$

The output signal of amplifier HV is applied to a counter, not illustrated, through a discriminator D.

In this amplifier arrangement, current $I_{AUS}$ of amplifier VP increases in proportion with the distance b. In this connection, central pickup $R_p2$ moves on potentiometer Rp so that the amplification $V_{HV}$ of main amplifier HV likewise increases in proportion with distance b.

The dependency of voltage $U_D$ of detector Z1 in relation to the ordinal number n of reflection and interplanar spacing d of analyzer crystal AK, to be derived from equation (4) is compensated by means of relays K1, K2 and relays N1, N2 that are actuated in the case of crystal exchange and/or switching to a different ordinal number of reflection n. Relays K1 and K2 operate switches k1, k2 that connect resistances $R_{K1}$ and $R_{K2}$, in addition to series resistance $R_V$, into the input circuit of main amplifier HV. Further resistances $R_{N1}$ and $R_{N2}$ can be connected into the feedback circuit with magnetic-field-dependent resistance $R_F$, over relays N1 and N2 and switches n1 and n2.

Instead of connecting resistances by means of relays K1, K2, N1, N2 for the purpose of varying amplification $V_{HV}$ by fixed amounts in the case of crystal exchange or change of ordinal number n, the magnetizing current $I_V$ of coil L2 may also be changed by fixed amounts. The relay contacts as possible sources of disturbance in the signal circuit are thus avoided.

Figure 5:
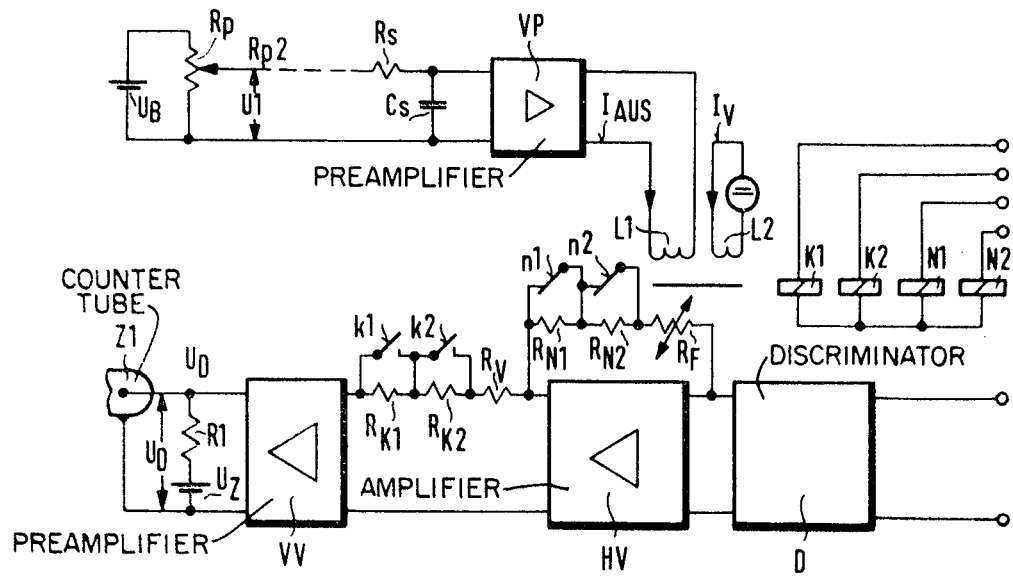

FIG. 7 shows still another possible modification of amplifier arrangement illustrated in FIG. 5. Potentiometer Rp is again connected across a direct current source $U_B$. Voltage U1 tapped on central potentiometer pickup $R_p2$ is applied to preamplifier VP through a filter consisting of resistance $R_s$ and capacitance $C_s$. The output current $I_{AUS}$ of preamplifier VP flows through coil L1. Coil L1, together with two further coils L3, L4, is arranged on a magnet yoke J2 illustrated in FIG. 8. Yoke J2 is provided with three legs, the central leg consisting of a permanent magnet Ma. The magnetization effected by permanent magnet Ma controls the adjustment of the working point of the magnetically controllable resistances $R_{F2}$ and $R_{F3}$ arranged in airgaps $L_{t1}$ and $L_{t2}$. Coil L1 is divided into two partial coils, one part being arranged, together with coil L4, around a part of the three-leg-magnet yoke and coil L3 with the other part of coil L1 around the second leg of magnet yoke J2. DC magnetization currents I1 and I2 are impressed on coils L4 and L3.

Magnetically controllable resistances $R_{F2}$ and $R_{F3}$ constitute a voltage divider situated in the output circuit of preamplifier VV. This preamplifier receives voltage pulses from detector Z1. If a current $I_{AUS}$ flows through coil L1, the magnetic-field-dependent resistance $R_{F2}$ is subject to the effect of the sum of premagnetization or bias field of the arrangement of FIG. 8 and of the magnetic field produced by current $I_{AUS}$ in coil L1, while the difference between the two fields acts on magnetic-field-dependent resistance $R_{F3}$. Accordingly, the resistance of the magnetic-field-dependent resistance $R_{F2}$ is increased, while that of $R_{F3}$ is reduced. Therefore, the input voltage of amplifier HV increases in proportion to current $I_{AUS}$ and, thus, in proportion with distance b of analyzer crystal AK from X-ray source Q (FIG. 1). Consequently, the hyperbolic connection of voltage $U_D$ of detector Z1 with distance b is compensated in accordance with the amplifier arrangement of FIG. 3. The voltage divider consisting of magnetic-field-dependent resistances $R_{F2}$ and $R_{F3}$ may be modified additionally by means of coils L3 and L4 so as to eliminate the change in amplification of the measuring channel resulting from exchange of crystals or a change in the ordinal number $n$ of reflection.

That which is claimed is:

1. An arrangement for compensating a hyperbolic dependency of the amplitude of voltage pulses produced in a detector for X-ray quanta, which occurs with a translation movement of an analyzer crystal of a linear X-ray spectrometer along a straight guide line comprising mounting means for the analyzer crystal, a potentiometer having a pickup connected to said mounting means, amplifier means for compensating the hyperbolic function, said amplifier means including a pulse channel having a preamplifier stage, said potentiometer being connected to the preamplifier, an ohmic resistance connected in series with said potentiometer for controlling the primary amplification of the pulse channel, means for connecting the detector to the input circuit of the preamplifier stage to effect amplification of the voltage pulses and means for displacing said pickup in proportion to the linear movement of the analyzer crystal.

2. An arrangement as set forth in claim 1, wherein the potentiometer comprises a sliding resistance having a wiper coupled to a sliding carriage mount, said mount being arranged for supporting the analyzer crystal and a spindle for moving said carriage.

3. An arrangement as set forth in claim 1, wherein the potentiometer consists of a multiturn potentiometer having a wiper element, said wiper being connected to a spindle, said spindle being arranged to drive the mount, said mount being a sliding carriage.

4. An arrangement as set forth in claim 1 wherein said potentiometer is connected in the output circuit of the preamplifier.

5. An arrangement as set forth in claim 1 wherein said potentiometer is connected in the input circuit of said preamplifier.

6. An arrangement as set forth in claim 1, wherein said ohmic resistance is an adjustable balancing resistor, said potentiometer being connected in series circuit with said adjustable balancing resistor, said series circuit being connected in the input circuit of said preamplifier.

7. An arrangement as set forth in claim 1, wherein said pulse channel further includes an amplifier stage, the output circuit of said preamplifier being connected to the input of said amplifier stage, said series circuit comprising said potentiometer and ohmic resistance including an adjustable balancing resistance, said series circuit being connected in the output circuit of the preamplifier.

8. An arrangement as set forth in claim 1, wherein said potentiometer is a contactless field plate potentiometer.

9. An arrangement for compensating a hyperbolic dependency of the amplitude of voltage pulses produced in a detector for X-ray quanta which occurs with a translation movement of an analyzer crystal of a linear X-ray spectrometer along a straight guide line and for avoiding the inscattering of disturbances into the connecting lines between the spectrometer and including an amplifier arranged to compensate the hyperbolic dependency comprising mounting means for the analyzer crystal, a potentiometer having a pickup connected to said mounting means, means for displacing said pickup in proportion to the linear movement of the analyzer crystal, a direct current source, means connecting said potentiometer across said source, said amplifier including a first preamplifier stage, means for applying the voltage produced on the potentiometer pickup to the input of said first stage, a filter connected in the input of said first stage for suppressing disturbing voltages, means for connecting the output current of said preamplifier to a control element, said control element including a first coil, a second coil and a magnet said second coil to the yoke, a magnetic field dependent resistance disposed in said airgap and said magnet yoke being arranged in the feedback circuit of a further amplifier connected to receive and amplify the detector signal.

10. An arrangement as set forth in claim 9, having at least one additional resistance inserted in the feedback circuit of said further amplifier, a corresponding relay for each additional resistance operably connected for inserting the resistance in the circuit for the purpose of compensating the variation in the voltage of the detector, which variation is a function of the ordinal number of reflection and of interplanar spacing of the analyzer crystal.

11. An arrangement as set forth in claim 9 further including means for controlling the premagnetization of the magnetic circuit of the magnet yoke by fixed amounts for the purpose of compensating the variation in the voltage of the detector, which variation is a function of the ordinal number of reflection and of interplanar spacing of the analyzer crystal.

12. An arrangement as set forth in claim 9, said first coil is arranged, with two further coils, on a second magnet yoke having a magnetized central leg and provided with magnetic-field-dependent semiconductor resistances situated in the two airgaps of the external legs and constituting a voltage divider situated in the output circuit of the amplifier, the voltage of the said divider tapped on one semiconductor resistance consisting the input voltage of the further amplifier.

13. An arrangement as set forth in claim 12, the ratio of the voltage divider can be modified by modifying the feed current of the two further coils for the purpose of compensating the variation in the voltage of the detector, which is a function of the ordinal number of reflection and of interplanar spacing of the analyzer crystal.

* * * * *

PO-1050
(5/69)

UNITED STATES PATENT OFFICE
CERTIFICATE OF CORRECTION

Patent No. 3,624,395          Dated November 30, 1971

Inventor(s) Kurt Tögel, Hubert Hötzel and Bernhard Lang

It is certified that error appears in the above-identified patent and that said Letters Patent are hereby corrected as shown below:

In the heading under [72]: "Kurt Togel" should read --Kurt Tögel--; "Hubert Hotzel" should read --Hubert Hötzel--

Col. 1, lines 11, 14, 16 and 22, "v" should be -- $v\ell$ -- equation (1), "v" should be -- $v\ell$ -- equation (2), "v" should be -- $v\ell$ -- equation (3), "sin v" should be --sin $v\ell$ --

Col. 2, line 59, in equation (5), "sin v1" and "sin v2" should be --sin $v\ell$ 1-- and --sin $v\ell$ 2--; also the equation number "(b5)" should be --(5)-- line 64, "or" should be --of--

Col. 3, line 71, after "of" insert --a--

Col. 4, line 13, the equation number "(b)" should be --(6)--

Col. 6, line 19, (Claim 9) after "magnet" insert --yoke having an air gap, said first coil being attached with-- line 21, "airgap" should be --air gap-- line 38, (Claim 12) before "said" insert --wherein-- line 42, "airgaps" should be --air gaps--

UNITED STATES PATENT OFFICE
CERTIFICATE OF CORRECTION

Patent No. 3,624,395    Dated November 30, 1971

Inventor(s) Kurt Tögel, Hubert Hötzel and Bernhard Lang

It is certified that error appears in the above-identified patent and that said Letters Patent are hereby corrected as shown below:

(continued)                    - 2 -

Col. 6, lines 44-45, "consisting" should be --constituting-- line 46, (Claim 13), before "the" insert --wherein--

Signed and sealed this 6th day of June 1972.

(SEAL)
Attest:

EDWARD M. FLETCHER, JR.          ROBERT GOTTSCHALK
Attesting Officer                Commissioner of Patents